US012790833B2

(12) United States Patent
Carpentier et al.

(10) Patent No.: US 12,790,833 B2
(45) Date of Patent: Nov. 10, 2026

(54) ACOUSTIC PANELLING FOR PRODUCING A FLOOR COVERING

(71) Applicant: Gerflor, Villeurbanne (FR)

(72) Inventors: Fabien Carpentier, Bollene (FR); Xavier Crionay, Bollene (FR)

(73) Assignee: Gerflor, Villeurbanne (FR)

( * ) Notice: Subject to any disclaimer, the term of this patent is extended or adjusted under 35 U.S.C. 154(b) by 999 days.

(21) Appl. No.: 16/491,169

(22) PCT Filed: Mar. 5, 2018

(86) PCT No.: PCT/FR2018/050493
§ 371 (c)(1),
(2) Date: Sep. 5, 2019

(87) PCT Pub. No.: WO2018/162828
PCT Pub. Date: Sep. 13, 2018

(65) Prior Publication Data

US 2020/0032526 A1 Jan. 30, 2020

(30) Foreign Application Priority Data

Mar. 6, 2017 (FR) ...................................... 1751767

(51) Int. Cl.
*E04F 15/10* (2006.01)
*B32B 27/30* (2006.01)
(Continued)

(52) U.S. Cl.
CPC .......... *E04F 15/107* (2013.01); *E04F 15/206* (2013.01); *B32B 27/304* (2013.01);
(Continued)

(58) Field of Classification Search
CPC .... B32B 27/304; E04F 15/105; E04F 15/107; E04F 15/181; E04F 15/182; E04F 15/206; E04F 2290/041; E04F 2290/043
See application file for complete search history.

(56) References Cited

U.S. PATENT DOCUMENTS

2004/0102120 A1* 5/2004 Plusquellec ........... E04F 15/206 442/370
2008/0138560 A1* 6/2008 Windmoller .............. B32B 3/06 428/46

(Continued)

FOREIGN PATENT DOCUMENTS

DE 202015100411 4/2015
EP 1938963 7/2008

(Continued)

OTHER PUBLICATIONS

Rapport de Recherche Internationale et l'Opinion Ecrite [International Search Report and the Written Opinion] Dated Jun. 14, 2018 From the International Searching Authority Re. Application No. PCTFR2018/050493 and Its Translation of Search Report Into English. (15 Pages).

(Continued)

*Primary Examiner* — Sathavaram I Reddy

(57) ABSTRACT

The invention relates to a multi-layer panel for producing a floor covering exhibiting sound-insulating properties, of which at least one of the layers is made from PVC, the said panel comprising male-female means for connecting or assembling several panels together, the said panel comprising at least one decorative layer bonded to a backing layer, the latter being bonded to a nonwoven textile sublayer intended to be in contact with the ground with a thickness of between 0.5 mm and 3 mm.

7 Claims, 1 Drawing Sheet

(51) Int. Cl.
*E04F 15/18* (2006.01)
*E04F 15/20* (2006.01)

(52) U.S. Cl.
CPC .......... *E04F 15/181* (2013.01); *E04F 15/182* (2013.01); *E04F 2290/041* (2013.01)

(56) References Cited

U.S. PATENT DOCUMENTS

| | | | | |
|---|---|---|---|---|
| 2013/0112499 | A1* | 5/2013 | Kitchen | B32B 7/022<br>442/268 |
| 2016/0222658 | A1 | 8/2016 | Hecht et al. | |

FOREIGN PATENT DOCUMENTS

| | | |
|---|---|---|
| WO | WO 02/10504 | 2/2002 |
| WO | WO 2018/162828 | 9/2018 |

OTHER PUBLICATIONS

EPLF "Underlay Materials Under Laminate Floor Coverings—Test Standards and Performance Indicators", Verband der Europäischen Laminatfussbodenhersteller e.V. [European Producers of Laminate Flooring], EPLF, XP055481598, Technical Bulletin, English Edition Aug. 2014, p. 1-15, Aug. 22, 2014.

* cited by examiner

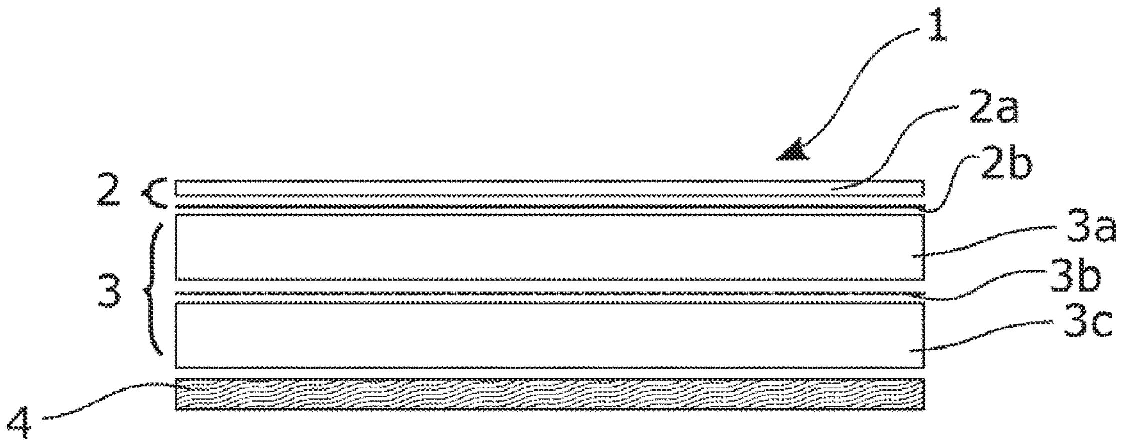
1
2a
2b
2
3a
3b
3
3c
4

ACOUSTIC PANELLING FOR PRODUCING A FLOOR COVERING

RELATED APPLICATIONS

This application is a National Phase of PCT Patent Application No. PCT/FR2018/050493 having International filing date of Mar. 5, 2018, which claims the benefit of priority of French Patent Application No. 1751767 filed on Mar. 6, 2017. The contents of the above applications are all incorporated by reference as if fully set forth herein in their entirety.

FIELD AND BACKGROUND OF THE INVENTION

The present invention relates to the technical sector of floor coverings, and more particularly a floor panel for producing a floor covering or the like. The panel according to the invention is in the form of a tile or plank, is made from a plastic such as polyvinyl chloride (PVC) and has good acoustic properties. The present invention also relates to a method for implementing an acoustic panel for implementing a floor covering.

It is well known to produce floor coverings from modular elements in plank or tile form. The attachment thereof is usually performed by means of an interlocking assembly of planks or tiles having male-female connection or assembly means. The laying thereof is referred to as free insofar as they are generally laid on the floor without adhesive, even though in some applications that can be considered. Such male-female panel connection or assembly means are in particular described in documents GB 2,256,023, EP 1,026,341, WO 2012/004701 or WO 2016/030627.

Floor coverings made from PVC, in the form of planks or tiles comprising such male-female connection or assembly means, also called LVT for "Luxury Vinyl Tile", are particularly advantageous insofar as they make it possible to obtain a very wide range of decorations, in particular very realistic imitation parquet, and are therefore easier to place and to clean whilst maintaining very good indentation and rolling resistance properties.

This type of floor covering has however poor sound insulation performance, even though reducing noise pollution is a major consumer expectation.

To overcome this disadvantage, a solution for improving the acoustic insulation of an LVT floor covering consists in laying an insulating underlay in advance and laying the panels to be assembled on top. This method is however tedious, insofar as it increases the cutting required and makes laying more complex. Most of these underlays must also be adhered to the floor before laying the panels to be assembled, such they do not slide on the floor during laying.

Another solution consists in integrating a foam underlay into the tiles or planks. The U.S. Pat. No. 8,893,850 B2 in particular proposes the use of polyurethane and rubber foam for material constituting a floor panel underlay. The foam used tends however to strongly weaken the resistance of the male-female bonding means over time. The foam is also crushed over time and loses the ability thereof to return to the shape thereof, which also leads to shifts in position between several contiguous planks and the loss of acoustic insulation properties. Furthermore, this type of underlay worsens the indentation and rolling resistance results of laid floor coverings.

SUMMARY OF THE INVENTION

One of the goals of the invention is therefore to propose a floor panel for the implementation of a floor covering or the like comprising male-female connection or assembly means and having good acoustic insulation performance whilst maintaining a good strength of the male-female connection or assembly means and a good resistance over time to indentation and rolling.

One of the objectives of the invention is in particular to propose a floor panel for the implementation of a floor covering having a good acoustic insulation performance, in particular the attenuation of impact noises, according to the EN ISO 10140-3 standard.

Another objective is also to propose a floor panel that is effective in attenuating impact noises within the room where they are created. This measurement is performed at the same time as the acoustic insulation measurement by means of a microphone measuring the sound level within the room according to the NF EN 16205 August 2013 standard which defines the laboratory measurements for impact noise within a room from floor coverings laid within said room.

Another aim is to propose a floor panel withstanding a passage of at least 25,000 cycles of a double band castor chair as defined in the ISO 4918 or NF EN 425 standard.

An objective is to propose a P3 class floor panel according to the UPEC classification and that in particular has an indentation value less than or equal to 0.20 mm, preferably less than or equal to 0.15 mm between two static residual indentation measurements performed according to the NF EN 433 standard.

Finally, another objective is to propose a floor panel that is resistant to traffic whilst retaining good acoustic insulation properties over time.

For this purpose, a multilayer panel is proposed for the implementation of a floor covering having acoustic insulation properties, for which at least one of the layers is made of PVC, said panel comprising male-female means for the connection or assembly of several panels therebetween, said panel comprising at least one decorative layer bonded to a reverse layer, where the reverse layer is bonded to a nonwoven textile underlay intended to be in contact with the floor and having a thickness comprising of between 0.5 mm and 3 mm.

The interest in such an underlay is to provide the panel according to the invention with good acoustic insulation performance whilst also allowing the male-female assembly means to resist traffic well. In fact, a good compromise between the acoustic insulation performance and the resistance of the male-female assembly means to traffic can be guaranteed with a thickness included between 0.5 mm and 3 mm and it can be performed for most machining profiles for these assembly methods. It is in fact possible that the male-female assembly means used in combination with a nonwoven textile thicker than 3 mm come apart or break under the effect of traffic since the thickness of the nonwoven textile makes the panel assembly too flexible and increases the stresses on the assembly means. On the other hand, a nonwoven textile thinner than 0.5 mm can limit the acoustic installation provided by the panel.

The nonwoven textiles that can be used according to the invention are in particular nonwoven textiles obtained according to known means: dry, wet, air laid or melted, advantageously bonded by mechanical (e.g. needling, water-jet, etc.), chemical (e.g. latex) or thermal (e.g. calendering, passing under hot air, etc.) bonding in order to improve the hold of the fibers therebetween and to retain good acoustic and mechanical properties over time.

Advantageously, the nonwoven textile underlay has a thickness included between 1 mm and 2.5 mm. With this thickness range, a better compromise can be achieved between acoustic insulation performance and resistance of the assembly means to traffic, in particular an acoustic attenuation according to the ISO 10140-3 standard over 15 dB and an indentation value less than or equal to 0.15 mm.

Preferably, the nonwoven textile underlay comprises a compression resistance greater than or equal to 20 kPa, more preferably greater than or equal to 100 kPa. Compression resistance is an important property of the underlay; it is decisive for maintaining over time a good acoustic installation provided by the underlay while also contributing to the resistance to traffic of the assembly means. The compression resistance is measured according to the CEN/TS 16354:2012 standard which in turn refers to the NF EN 826 standard of May 2013. This method corresponds to a measurement of the compression for a 0.5 mm deformation.

A nonwoven textile underlay comprising a compression resistance greater than or equal to 20 kPa serves to provide a good acoustic insulation while also contributing to the good resistance to traffic of the assembly means. However, when the covering is subject to significant traffic, in particular in reception areas or corridors, it is preferable that the nonwoven textile underlay comprise a compression resistance greater than or equal to 100 kPa in order to maintain the acoustic properties thereof over time.

More preferably, the nonwoven textile underlay comprises a compression resistance greater than or equal to 400 kPa. In this way a better result can be achieved both for retaining acoustic insulation performance over time and also resistance to traffic of the assembly means. It is observed that with a compression resistance greater than or equal to 400 kPa, the underlay can retain the thickness thereof despite repeated traffic of heavy loads and create less stress near the assembly means. It is for example observed that assembly means having an assembly direction called "vertical", meaning perpendicular to the plane of the floor covered by the floor-covering panel, have less risk of unclipping if they are used in combination with a non-textile underlay comprising a compression resistance greater than or equal to 400 kPa.

Advantageously, the nonwoven textile underlay comprises natural fibers such as cellulose, cotton or linen fibers, synthetic fibers, in particular polyester, polyamide, polyethylene terephthalate, aramid, Nomex®, polyethylene naphthalate, polypropylene, or even synthetic mineral fibers such as glass fibers or basalt fibers.

Advantageously, the non-woven textile is produced from a mixture of natural fibers and synthetic fibers and/or synthetic mineral fibers. Without limitation, the nonwoven textile underlay has a surface density over 100 g/m$^2$. Without limitation, in the nonwoven textile underlay, the ratio of surface density, taken in g/m$^2$ to the thickness, taken in mm, is greater than 200.

The panels according to the invention and in particular the reverse layer are sufficiently stiff such that the male-female assembly means can be machined, formed by injection molding or cut on the edges thereof and that the assembly thereof allows locking of panels therebetween other under normal conditions of use, where this locking prevents the panels from being disassembled in at least one direction. Preferably, the panel according to the invention and more specifically the reverse layer of the panel have a stiffness under deflection greater than the maximum stiffness under deflection allowed for meeting the ISO 24344:2008 international standard. Meaning that a panel or the reverse layer of the panel according to the invention subject to this test would have permanent breaks, cracks, crazing and other defects. It is in fact important that the panels be non-flexible, in particular for making laying of the panels according to the invention easier. The term "non-flexible" means in particular that the panel according to the invention does not undergo meaningful deformation under its own weight when it is held by an edge by a user. The term "non-flexible" is in particular defined by a method described for example in the ISO DIS 10581:2011 or ISO 24344:2008 standard. In this method, the flexibility is defined by the capacity of the panel or layer of the floor covering to be rolled around a 20 mm mandrel without the formation of cracks or crazing. It is also important that the stiffness under deflection of the panel and in particular the reverse layer be sufficiently large such that the male-female means of assembly can be machined in it and that the panels can be assembled. The stiffness under deflection depends on each of the layers of the panel according to the invention, where the person skilled in the art is able to define various compositions and thicknesses of the layers for achieving the expected stiffness.

The invention also relates to a manufacturing method for a multilayer panel comprising male-female means for connection or assembly of several panels therebetween for implementing a floor covering having acoustic insulation properties, where this method comprises at least the steps consisting in:

- binding together, and in this order, at least one decorative layer (2), a reverse layer (3) and an underlay (4) of nonwoven textile, where said underlay (4) of nonwoven textile is intended to be in contact with the floor and to have a thickness included between 0.5 mm and 3 mm, and at least one of the layers is made from PVC;
- machining the male-female connection or assembly means near the edges of the panel allowing for the assembly of several panels therebetween.

Advantageously, the textile underlay used in the method according to the invention has a resistance to compression, measured according to the CEN/TS 16354:2012 standard, which in turn refers to the NF EN 826 standard, greater than or equal to 20 kPa, preferably greater than or equal to 100 kPa and preferably greater than or equal to 400 kPa.

Advantageously the textile underlay used in the method according to the invention has a surface density over 100 g/m$^2$.

Advantageously, the textile underlay is bonded to the reverse layer by calendering, cold adhering, hot adhering, extrusion of the reverse layer on the underlay, or by means of the powdering of a hot-melt adhesive.

Advantageously the method according to the invention comprises a step consisting in calendering the textile underlay in such a way as to make the thickness thereof homogeneous, before bonding said textile underlay to the reverse layer. Insofar as nonwoven textiles can have a highly variable thickness on the surface thereof, this additional step serves to slightly compress them in order to make the thickness thereof more homogeneous and in order to guarantee the same mechanical behavior over the entire surface.

Fillers that may be used are in particular inorganic fillers, for example clays, silica, kaolin, talc, calcium carbonate.

The liquid plasticizers that may be used are in particular plasticizers such as Diisononyl Phthalate (DINP), Diisodecyl Phthalate (DIDP), 2-Ethylhexyl Diphenyl Phosphate (DPO), Dioctylic terephthalate (DOTP), 1,2-Cyclohexane dicarboxylic acid diisononyl ester (DINCH), plasticizers from the benzoate family, plasticizers from the adipate family, plasticizers sold under the PEVALEN® brand by Perstorp, epoxidized soybean oil (ESBO), epoxy octyl stearate (EOS), entirely or partially biosourced plasticizers, for instance plasticizers from the Polysorb® ID 37 line sold by Roquette Pharma, plasticizers from the Citrofol® line sold by Jungbunzlauer International AG, or plasticizers from the Soft-n-safe® line sold by Danisco.

The panels according to the invention assume the form of planks or tiles, each panel comprising an upper face intended to be in contact with the user, a lower face intended to be in contact with the floor and four edges. The edges of the panels according to the invention are machined in order to have male-female assembly means, making it possible to connect several panels therebetween. Male-female assembly means in particular refer to means comprising a slot machined on one of the edges of a panel and configured to be assembled with a tab machined on the opposite edge of an adjacent panel. In general, the male-female assembly means comprise a first machining profile machined on one edge of a panel and configured to be assembled to a second machining profile machined on an opposite edge of an adjacent panel. The panels thus obtained generally have two pairs of machining profiles, each pair comprising a first and second machining profile on two opposite edges of a panel. The first and second machining profiles of each pair are not necessarily similar, in particular depending on the length of the considered edge and the desired assembly direction. The assembly of the panels may in particular be performed in a direction perpendicular to the floor in the case of so-called "vertical" assembly means, in a direction parallel to the floor in the case of so-called "horizontal" assembly means, or in more complex directions, for example by means of the rotation and/or translation of a male assembly means within a female assembly means. Such assembly means are in particular described in documents GB 2,256,023, EP 1,026,341, WO 2012/004701 or WO 2016/030627. Preferably, once assembled, the assembly means block the movement of two panels at once in a vertical direction, i.e., perpendicular to the floor, and in a direction that is perpendicular to the edge of the panel on which the considered assembly means is machined and parallel to the plane formed by the floor. The assembly means and their machining profiles may in particular be obtained by in-line machining, injection molding of the panel or by cutting, in particular by hollow punch.

The panels according to the invention have a thickness generally of between 3 mm and 10 mm, preferably between 4 mm and 6 mm. This thickness is measured between the upper surface intended to be in contact with the user and the lower surface intended to be in contact with the floor. The panels according to the invention have a width of between 8 cm and 60 cm, preferably between 15 cm and 25 cm, and a length of between 80 cm and 240 cm, preferably between 100 cm and 150 cm.

The underlay made from a nonwoven textile can in particular be bonded to the reverse layer by cold or hot adhering, by powdering of adhesive as defined in the patent EP 1,570,920 B1 from the applicant, in particular by powder coating with polyester, co-polyester or EVA (ethylene vinyl acetate) glue), by the use of a double-sided adhesive or even by thermoadhering.

Without limitation, the panels according to the invention can be grained and/or covered with a surface varnish, in particular to make maintenance thereof easier and to protect them against wear.

BRIEF DESCRIPTION OF THE SEVERAL VIEWS OF THE DRAWINGS

Other advantages and characteristics will emerge more clearly from the description which follows, given as a nonlimiting example, with reference to the single attached figure;

FIG. 1 shows, schematically, a section view of a floor covering according to the invention.

DESCRIPTION OF SPECIFIC EMBODIMENTS OF THE INVENTION

In reference to FIG. 1, the floor covering (1) according to the invention comprises:

a decorative layer (2);
a reverse layer (3)
an underlay made of a nonwoven textile (4).

The decorative layer (2) is made for example from a transparent wear layer, for example made from plasticized, unfilled PVC (2*a*) and a decorative film (2*b*). The decorative layer (2) can also be obtained from granules made of PVC and then pressed or even by plastisol coating, by slot die extrusion or by calendering.

The reverse layer (3), for example, constitutes a first layer made from PVC (3*a*) intended to be bonded to the decorative layer (2), a second layer (3*c*) intended to be bonded to the underlay (4) and a reinforcement (3*b*) bonded between the first layer (3*a*) and the second layer (3*c*). The layers (3*a*) and (3*c*) are for example obtained from filled plasticized PVC and formed by calendering. The reverse layer (3) can also result from granules made from PVC and then pressed or even by plastisol coating or by slot die extrusion. The production of this layer by means of calendering nevertheless remains the preferred manufacturing method thereof in terms of cost and resulting mechanical performance. The reinforcing grid is in particular obtained from a glass mat, a glass grid or a complex comprising a bonded glass mat and grid.

Example 1

In order to perform acoustic and mechanical tests, LVT planks were prepared.

These planks constitute:

- Two plasticized PVC based reverse layers (3*a*, 3*c*) comprising the filler. The layer (3*a*) also comprises glass fiber particles for providing the plank good dimensional stability.
- A decorative film printed (2*b*) in PVC.
- A transparent wear layer of plasticized PVC without filler (2*a*) which protects the printed film of PVC.
- A surface polyurethane treatment of the transparent wear layer (not shown).

The components and characteristics of the layers (2*a*, 3*a*, 3*c*) and printed film (2*b*) correspond to the product sold by the applicant under the Creation 55 Insight Clic System name. The first layer (3*a*) comprises about 33% PVC, 10% plasticizers (DINP), 4% additives (e.g. process aids, stabilizers, pigments), 3% PVC particles mixed with glass fibers and 50% filler. The second layer (3*b*) comprises about 33% PVC, 10% plasticizers (DINP), 4% additives (e.g. process aids, stabilizers, pigments) and 55% filler.

In general, a reverse layer (3) according to the invention may be obtained with a composition comprising about 30% PVC, about 10% plasticizers, about 5% additives (e.g. process aids, stabilizers, pigments) and about 55% fillers.

Male-female connection or assembly means allowing for the assembly of several panels are machined into the reverse layers (3*a*, 3*c*). These means allow for the assembly of planks in a direction perpendicular to the floor and are described in the patent application WO 2016/030627 from the applicant whose content is incorporated in the present application.

In order to evaluate the acoustic interest of the panels according to the invention, a nonwoven textile underlay (4) is laminated on the reverse of the second layer (3*c*). The lamination is performed using a double-sided adhesive film. Other lamination methods are possible such as pre-spreading adhesive onto the nonwoven textile by the powdering of a hot melt adhesive, adhering with an acrylic adhesive or even adhering with a hot melt adhesive.

Three different underlays whose characteristics are given in detail in the following table were bonded to the reverse layers (3*c*) of various panels thus formed. The underlays SC-01 and SC-02 are made of nonwoven textiles according to the invention; the underlay SC-03 is a polyolefin foam used as a reference.

| Underlay number | Thickness | Type | Material | Surface density | Compression resistance (CEN/TS 16354: 2012) |
|---|---|---|---|---|---|
| SC-01 | 1 mm | Nonwoven needlepunched, calendered, heat fixed and heat bonded | Polyester fibers. 200 g/m$^2$ of fibers Coating of 20 g/m$^2$ of copolyester powder | 220 g/m$^2$ | ≥100 kPa |
| SC-02 | 0.93 mm | Nonwoven needlepunched | Polyester fibers. | 227 g/m$^2$ | 400 kPa ± 10% |
| SC-03 (reference) | 1.5 mm | foam | Closed cell polyolefin foam, physically crosslinked, laminated with a polyolefin sheet | 344 g/m$^2$ | ≥400 kPa |

The resulting panels according to the invention first undergo a first impact machine test in order to determine the impact noise attenuation value of the product before traffic, in other words before wear. The panels next go through the castor chair test set by the NF EN 425 (or ISO 4918) standard in order to observe phenomena of breakage or delamination between the layers. Here the objective is to observe the behavior of the acoustic insulation properties as a function of the number of castor chair cycles endured. The castor chair test is taken up to 35,000 cycles if there is still no breakdown.

After going through the castor chair test, a second acoustic test is performed to verify the behaviour of the acoustic properties after traffic, after wear. To do that, panels are required that have not been damaged (e.g. no breakage of the male-female assembly means nor delamination between the various layers of the plank). An acoustic test is performed on the panels starting at 15,000 castor chair cycles, and then after 20,000 cycles, 25,000 cycles and 30,000 cycles.

An indentation test is also performed on one plank sample according to the invention that has not been exposed to castor chair traffic.

| Underlay number | Acoustic insulation at 0 cycles (dB) - EN ISO 10140-3 | Walking noise #1 (dB) - NF EN 16205 | Acoustic insulation at 15,000 cycles (dB) - EN ISO 10140-3 | Walking noise #2 (dB) - NF EN 16205 | Acoustic insulation at 20,000 cycles (dB) - EN ISO 10140-3 | Acoustic insulation at 25,000 cycles (dB) - EN ISO 10140-3 | >35,000 cycles | Indentation (mm) |
|---|---|---|---|---|---|---|---|---|
| SC-01 | 18 | 71 dB | 17 | 71 dB | 17 | NC | Breakage of assembly means | 0.13 |
| SC-02 | 15 | 72 dB | 14 | 74 dB | 14 | Breakage of assembly means | | 0.13 |
| SC-03 | 16 | 69 dB | 15 | 72 dB | Breakage of assembly means | | | 0.2 |

This table serves to show that the SC-01 and SC-02 underlays according to the invention retain good acoustic insulation and walking noise performance and do so even after 20,000 cycles or even 25,000 castor chair cycles, even whilst preserving the behavior of the assembly means of the panels. The compression resistance of the nonwoven textile underlay is also an important factor; a compression resistance over 100 kPa, advantageously over 400 kPa, serves to improve the resistance of the assembly means over time and to retain good acoustic insulation and walking noise performance. The castor chair tests show that the panels according to the invention also have good results and ensure a better resistance of the assembly means over time, especially in comparison with a foam underlay. The values of the indentation tests are also comparable with equivalent panels without underlay and significantly better than the results of panels on a foam underlay.

Example 2

In order to evaluate the impact of the underlay surface density to underlay thickness ratio, the SC-01 and SC-02 underlays and also the four additional underlays SC-04 to SC-07 are bonded to various layers (3*c*) of various panels similar to those from example 1 in order to form panels according to the invention. The underlays SC-04 to SC-07 are made from nonwoven textiles according to the invention. The thicknesses thereof and the surface densities thereof are given in the following table.

The panels thus formed next go through the castor chair test set by the NF EN 425 (or ISO 4918) standard in order to observe phenomena of breakage of the assembly means or delamination between the layers.

| Underlay number | Surface density ($g/m^2$) | Thickness (mm) | Number of castor chair cycles before breakage of the assembly means | Surface density/ thickness ratio |
|---|---|---|---|---|
| SC-01 | 220 | 1 | >30,000 | 220 |
| SC-02 | 227 | 0.93 | >20,000 | 244 |
| SC-04 | 300 | 0.87 | >30,000 | 344 |
| SC-05 | 268 | 1.05 | >30,000 | 255 |
| SC-06 | 308 | 1.66 | <15,000 | 185 |
| SC-07 | 300 | 1.8 | <15,000 | 166 |

It is thus observed that the ratio between the surface density of the underlay and the thickness thereof must be greater than 200 $g/m^2$ per millimeter of thickness of the nonwoven textile underlay for improving the number of castor chair cycles which can be supported by the covering. In particular more than 15,000 castor chair cycles can be supported this way. An increase of the thickness of the nonwoven textile underlay, for improving acoustic attenuation, must therefore be compensated for by means of an increase in the surface density in such a way as to not create excessive mechanical stresses on the assembly means. Adhering to this ratio is in particular very important when the reverse layer comprises at least one plasticized PVC layer, in particular a non-flexible layer.

What is claimed is:

1. A multilayer panel for implementation of a floor covering having acoustic insulation properties, wherein at least one layer is made of PVC, said multilayer panel comprising a male-female connection configured for assembly with one or more adjacent panels, said multilayer panel comprising at least one decorative layer bonded to a reverse layer, wherein the reverse layer is bonded to a nonwoven textile underlay intended to be in contact with the floor and having a thickness of between 0.5 mm and 3 mm, wherein the nonwoven textile underlay comprises a resistance to compression, measured according to the CEN/TS 16354:2012 standard, which in turn refers to the NF EN 826 standard, of greater than or equal to 100 kPa, and wherein the nonwoven textile underlay has a ratio of surface density, taken in g/m2 to the thickness, taken in mm, greater than 200.

2. The multilayer panel according to claim 1 wherein the nonwoven textile underlay has a thickness of between 1 mm and 2.5 mm.

3. The multilayer panel according to claim 1 wherein the nonwoven textile underlay comprises a compression resistance of greater than or equal to 400 kPa.

4. The multilayer panel according to claim 1 wherein the nonwoven textile underlay comprises natural, synthetic or synthetic mineral fibers.

5. The multilayer panel according to claim 4 wherein the nonwoven textile underlay comprises polyester fibers or polypropylene fibers.

6. The multilayer panel according to claim 1 wherein the nonwoven textile underlay has a surface density of over 100 g/m2.

7. The multilayer panel according to claim 1 wherein the male-female connection is machined into the reverse layer.

* * * * *